J. N. RATTERREE.
TIRE.
APPLICATION FILED OCT. 3, 1913.

1,138,315.

Patented May 4, 1915.
2 SHEETS—SHEET 1.

Inventor
J. N. Ratterree

Witnesses
M. F. Garrett
P. M. Smith

By Victor J. Evans
Attorney

J. N. RATTERREE.
TIRE.
APPLICATION FILED OCT. 3, 1913.
1,138,315.
Patented May 4, 1915
2 SHEETS—SHEET 2.
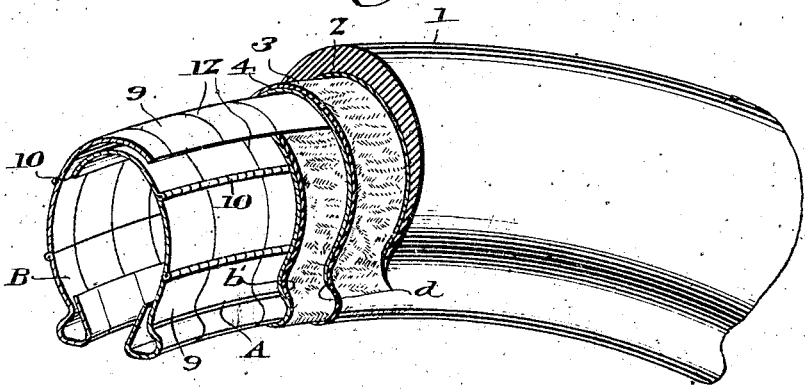
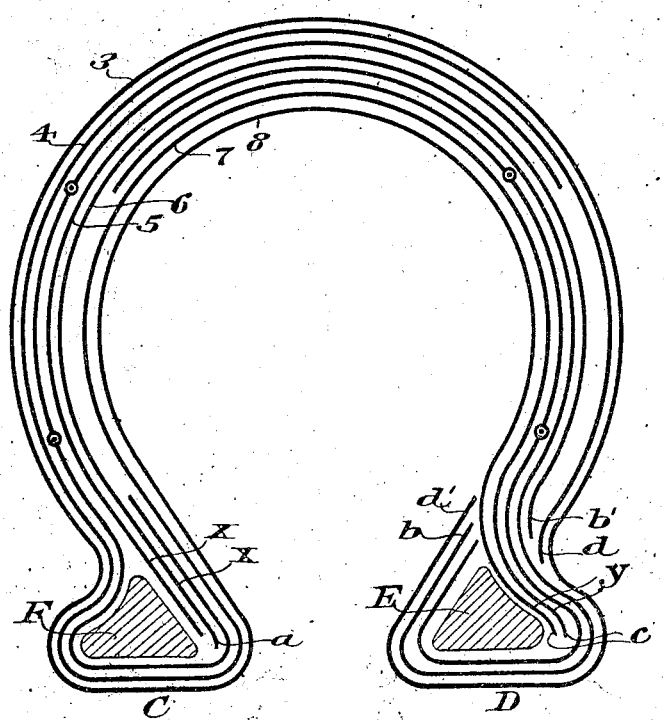
Inventor
J. N. Ratterree
Witnesses
By Victor J. Evans
Attorney

UNITED STATES PATENT OFFICE.

JAMES N. RATTERREE, OF LITTLE ROCK, ARKANSAS.

TIRE.

1,138,315.   Specification of Letters Patent.   Patented May 4, 1915.

Application filed October 3, 1913. Serial No. 793,241.

*To all whom it may concern:*

Be it known that I, JAMES N. RATTERREE, a citizen of the United States, residing at Little Rock, in the county of Pulaski and State of Arkansas, have invented new and useful Improvements in Tires, of which the following is a specification.

This invention relates to tires such as are in common use on automobiles, the object of the invention being to provide a novel and effective armor for pneumatic tires which will render the tire puncture proof and also eliminate the weakening of the tire to an extent which will result in what is known as a "blow out."

The puncture and blow out proof expedient forming the subject matter of this invention and hereinafter particularly described may either be incorporated in the outer casing itself and form a part thereof, or it may be utilized as an inner liner or reliner.

With the above and other objects in view, the invention consists in the construction, combination and arrangement of parts, as will hereinafter be more fully described, illustrated and claimed.

Figure 1:
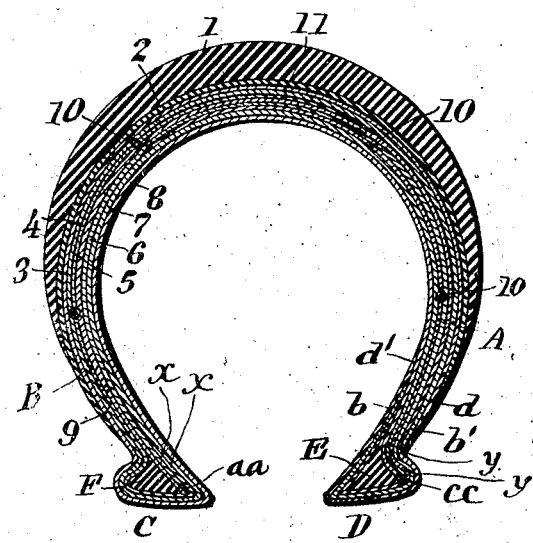
Figure 2:
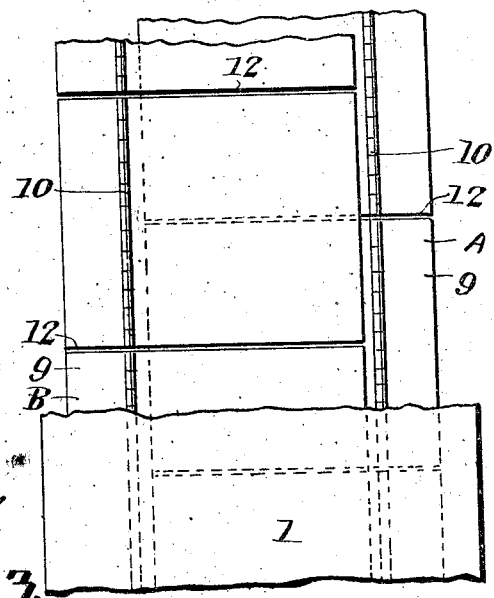
Figure 3:
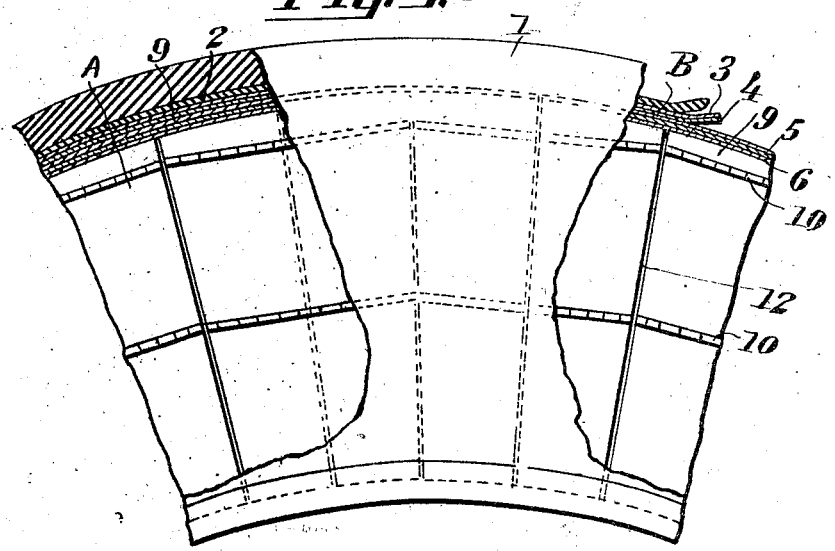

In the accompanying drawings: Figure 1 is a cross section through a tire embodying the present invention showing the protecting armor incorporated in and forming a part of the outer case or shoe. Fig. 2 is a plan view of a section of the tire, partly broken away. Fig. 3 is a side elevation of the same, partly broken away. Fig. 4 is a perspective view of a section of the tire with the outer fabric and rubber partly removed to show the metallic portions of the tire. Fig. 5 is an enlarged cross sectional diagram showing the manner of wrapping the fabric sheets or plies of fabric.

Referring first to Figs. 1 to 4 inclusive wherein the protective armor is shown as incorporated in the body of the outer shoe or casing, 1 designates the outer layer of the outer case which is ordinarily composed of solid rubber, 2 designating an inner and relatively thin layer of rubber vulcanized or otherwise fastened to the inner surface of the tread or outer section 1.

3, 4, 5, 6, 7 and 8 represent layers or plies of fabric all of which lie within the outer rubber layers 1 and 2 above referred to and which are employed to cover in and inclose the metallic portions of the protector or armor hereinafter particularly described. The metallic part of the armor is formed of a pair of steel bands designated A and B, each of said bands being composed of two or more rows or longitudinal series of sections or plates 9 of thin spring metal of sufficient gage to resist puncture on the part of tacks, nails and other pointed devices which are encountered in ordinary road work. The several rows or series of steel bands are hingedly or pivotally connected together as shown at 10 so as to provide greater transverse elasticity or resiliency. Furthermore the outer portions of the bands are overlapped as indicated at 11 thereby giving a double thickness of metal along the tread of the tire. A small gap or space is left at 12 between the adjacent edges of the sections or plates of which the metallic armor is composed so as to allow for the flexing of the armor as a whole.

Referring to Figs. 2 and 3 it will be observed that the sections 9 of one band overlap the gaps or spaces 12 between the meeting edges of the sections of the overlapping band or in other words, the steel bands A and B break joint with each other thereby forming a practically continuous and unbroken metallic liner or protective armor.

Referring now particularly to Figs. 1 and 5, the preferred method of applying the layers or plies of fabric is shown, as related to the incorporation of the armor in the outer case or shoe of a tire. Two layers or plies $x$—$x$ beginning at $a$—$a$ extend from one clencher bead C transversely between the two armor bands, one of said plies terminating at the point $b$ and the other at the point $b'$ adjacent thereto but at the opposite side of the other clencher bead D. Two other layers $y$—$y$ start at the points $c$—$c$ adjacent to the clencher bead D and the triangular core E within the same and pass around the inner face of one of the steel bands, thence around the other clencher bead C forming the innermost layer of the completed tire and exteriorly of the other steel band, forming the outermost layers of the tire carcass one of said last named layers or plies terminating at the point $d$ while the other one encircles the clencher bead D and terminates at the point $d'$ upon the inner face of the complete outer case or shoe. The arrangement just above described applies to an outer case or shoe of the clencher type as illustrated in Fig. 1, embodying the clencher beads C and D and the cores E and F.

The same principle of construction applies to the reliner illustrated in Fig. 5 wherein the clencher beads shown in Fig. 1 are done away with and the edges G tapered to a point or edge so that they may be overlapped and allowed to extend entirely around the inflatable inner tube now in common use in all pneumatic tires.

In Fig. 6 I have illustrated the invention as applied to an outside protective covering designed to extend entirely around the outer case or shoe, the device shown in Fig. 6 differing from those shown in Figs. 1 and 5 in that the edges H are turned outwardly to form hooks 13 which engage under the flanges of the rim.

Any desired number of plies or thicknesses of fabric either with or without rubber combined therewith may be placed around the steel bands so as to prevent any contact between metal and metal where the steel bands overlap each other. The protective armor may of course be made of any desired size in accordance with the size of the tire and if desired additional layers or plies of fabric and rubber or glue may be supplied to give the required strength to resist puncture and blow outs.

What I claim is:

A protective armor for pneumatic tires, comprising a plurality of puncture-proof bands extending longitudinally of the tire and having their inner marginal portions arranged in overlapping relation to each other, a fabric sheet extending from one outside margin of one band transversely around the inner face of said band between the overlapping portions of the bands and around the outer side of the opposite band, and another fabric sheet extending from the other outside margin of the last named band around the inner faces of both bands and then returned around the outer faces of said bands.

In testimony whereof I affix my signature in presence of two witnesses.

JAMES N. RATTERREE.

Witnesses:
LOUELLA PAUL,
CLAY E. SMITH.